(No Model.) 2 Sheets—Sheet 2.

H. COOK.
AMALGAMATOR.

No. 431,441. Patented July 1, 1890.

Witnesses:
Hamilton D. Turner.
A. Vincent Groupe.

Inventor:
Henry Cook
by his Attorneys
Howson & Howson

UNITED STATES PATENT OFFICE.

HENRY COOK, OF PHILADELPHIA, PENNSYLVANIA.

AMALGAMATOR.

SPECIFICATION forming part of Letters Patent No. 431,441, dated July 1, 1890.

Application filed February 26, 1890. Serial No. 341,797. (No model.)

*To all whom it may concern:*

Be it known that I, HENRY COOK, a citizen of the United States, and a resident of Philadelphia, Pennsylvania, have invented certain Improvements in Amalgamators, of which the following is a specification.

The object of my invention is to construct an amalgamator that will consist of few parts and that will thoroughly and quickly separate gold or like material from the gangue. This object I attain in the following manner, reference being had to the accompanying drawings, in which—

Figure 1:
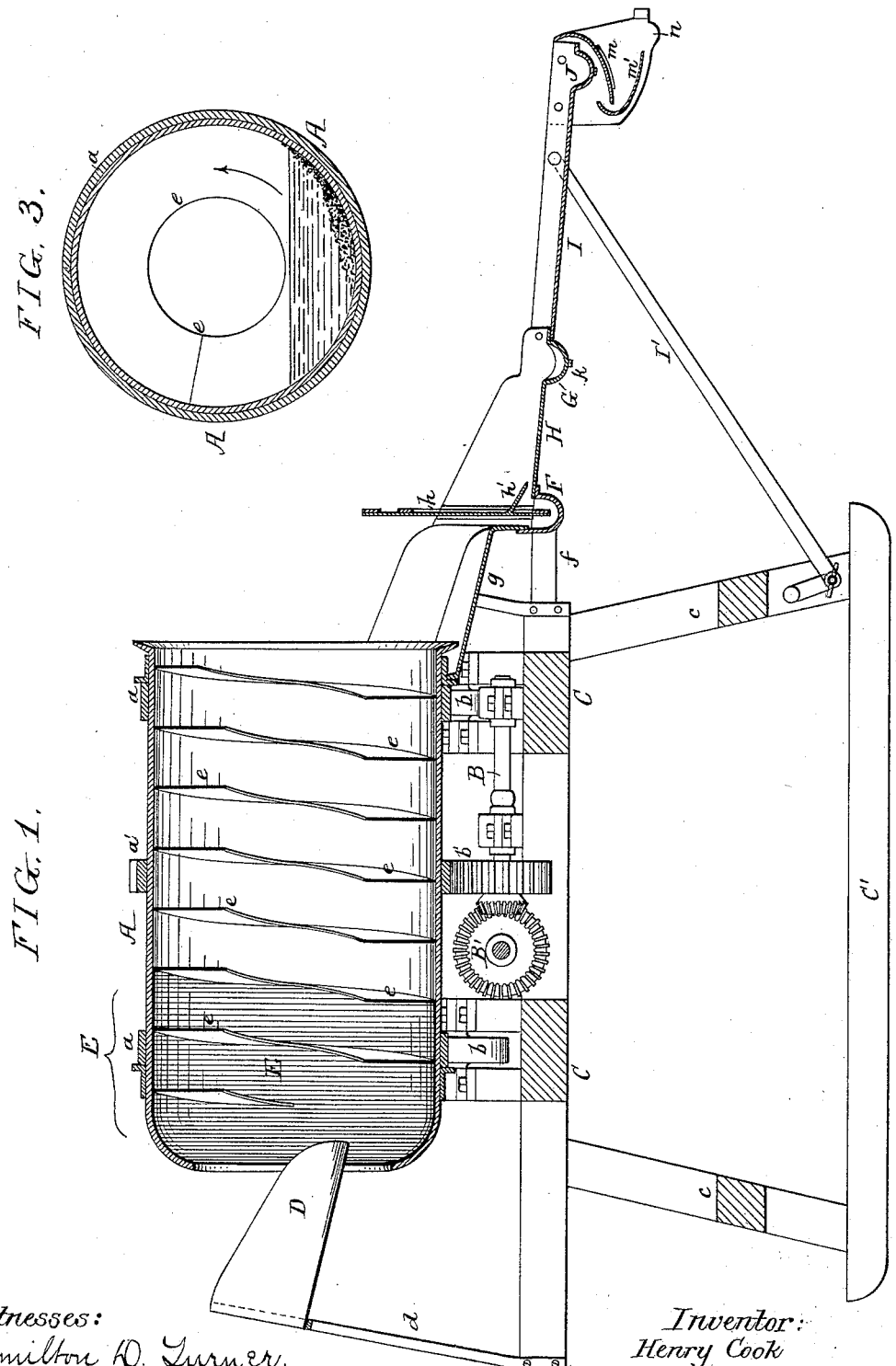
Figure 2:
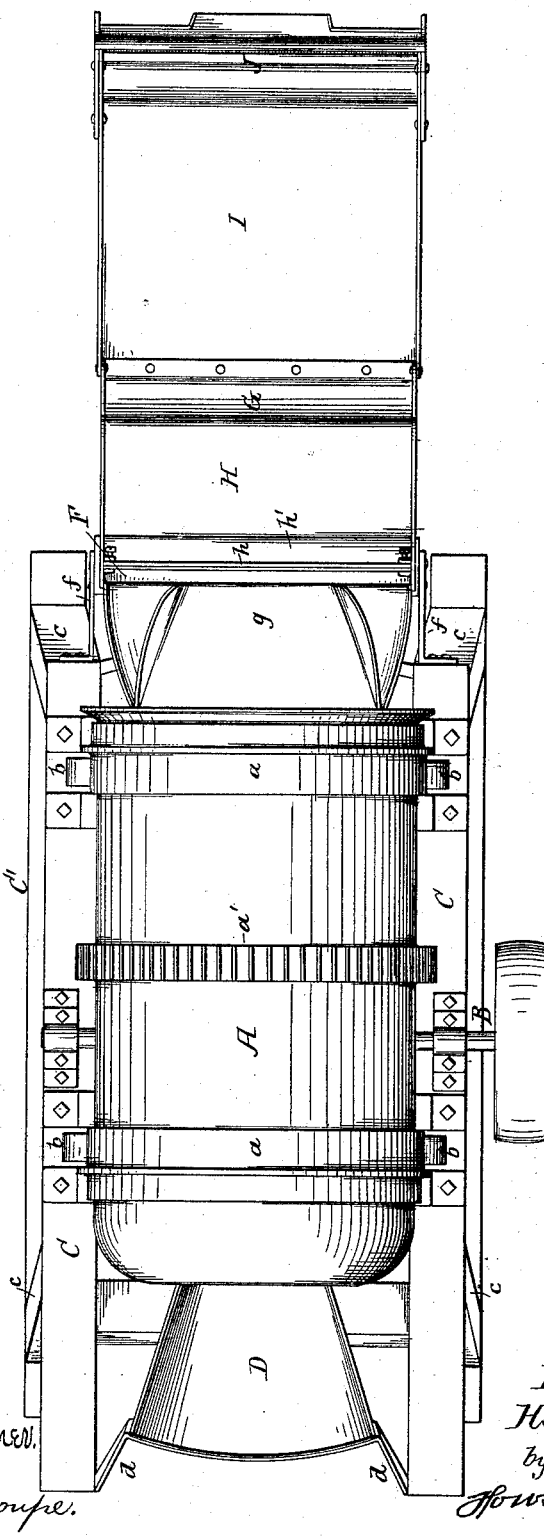

Figure 1 is a longitudinal sectional view of my improved amalgamator. Fig. 2 is a plan view, and Fig. 3 is a sectional diagram illustrating one of the features of my invention.

A is a horizontal revolving cylinder having rails $a$ $a$, which rest on supporting-wheels $b$ $b$, mounted in the frame. The cylinder has also an annular rack $a'$, driven by a pinion $b'$ on a shaft B, which is driven from a transverse shaft B', provided with a suitable belt-wheel or handle. The whole device is mounted on the table C, having suitable legs $c$ $c$. I prefer to mount the table on runners C', so that the device can be moved readily.

Some of the details of construction of this device are similar to those shown in my application for patent filed May 20, 1887, Serial No. 238,815.

The cylinder A is open at both ends, as clearly shown in the sectional view, and material is fed to the cylinder through a hopper or chute D, mounted on supporting-rods $d$ $d$, secured to the table. The mouth of the chute projects into the cylinder, as clearly shown.

Secured to the cylinder and extending the full length thereof is a screw-flange $e$, which is of a height sufficient to prevent the rapid flowing of the water through the cylinder. I line a portion of the cylinder A only with copper or other suitable amalgamating material E, which has an affinity for mercury; but the remaining portion of the cylinder, as well as the blades of the screw, are made of material which has not an affinity for mercury, for a purpose fully described hereinafter.

Beyond the cylinder A of the machine is a transverse trap F, supported by a bracket $f$, secured to the table C. A chute $g$ connects this trap with the cylinder, receiving the material as it flows from the cylinder and directing it to the trap F. A gate or partition $h$ extends into the trap, and is of sufficient height to prevent splash of the material, and this gate is also provided with a deflecting-plate $h'$, against which the material strikes as it bubbles up from under the gate in the trap.

By constructing the trap and gate in the manner shown I am enabled to have a steady and even flow of material and water over the amalgamating-table without the usual cutting action.

Extending from the trap F to an amalgamating-well G is a table H. This table H, I make of material or cover with material having affinity for mercury, as well as the table I, which extends from the well G to the well J. The mercury-well is formed from the material of the well H by simply making a depression in the end of the plate forming the table, so that a continuous amalgamating-surface is thus secured from the trap to and into the well, and the material to be saved can have an uninterrupted flow from the table into the well. The contents of the well can be discharged through openings closed by screw-plugs $k$.

The table I and mercury-well J are made in a similar manner to the table H and well G. By making the tables and wells of continuous amalgamating material the gangue cannot pass between the amalgamating material and the amalgam, as would be the case if the well were made of non-amalgamating material.

The trap F and its gate $h$, I prefer to construct of non-amalgamating material, so that the gangue and the ores will pass readily through the trap and be distributed evenly over the surface of the table, as fully described above.

The inclination of the tables H and I can be regulated by the adjustment of the supporting-bars I'.

After the tailings pass the last well they drop onto an amalgamating-step $m$ and then onto a similar step $m'$ and over a mercury-well $n$ to waste, the well collecting any amalgam that remains in the gangue. The steps $m$ $m'$ and well $n$ are detachably secured to the table I, as shown in Fig. 1, and form what I call a "tailings-indicator." The pulp containing the amalgamating mineral on entering the rotating and amalgamating and separating cylinder is spread over the amalgamating-surface in channels formed by non-amalgamating spiral blades, and in that condition rolls and slides over said surface. The mineral is thus brought in contact with the mercury and amalgam formed, which is worked down the channels with the gangue and with the fine particles of mineral not amalgamated to the non-amalgamating or lower portion of the cylinder, the rotating action of which separates the mineral from the gangue, allowing the amalgam to pick up other particles of mineral as they are pulled back, washed, and brought in contact with the amalgam, and collected in little bunches, and in that condition they pass to the amalgamating tables and wells. The particles of mineral, if not coated with mercury, receive enough mercury from the drum to coat them and assist the amalgam in collecting, thus making the whole distance through the cylinder amalgamating, and only about one-third of it amalgamating-surface. The material after it passes under the trap is spread evenly upon the amalgamating-table, passing over the first mercury-well to the second amalgamating-table to the second well, the wells separating and collecting the amalgam from the gangue in its passage through the machine. The tailings are then directed through the tailings-indicator and pass over the amalgamating-plates therein, dropping from one to the other, which form steps. The mercury being deposited thereon runs down to the lower well and there collects, the tailings passing over the edge of the well. By testing this indicator the waste is ascertained, and the flow of material or water is regulated accordingly.

I claim as my invention—

1. The combination, in an amalgamator, of the horizontal cylinder, mechanism for revolving the same, spiral retarding-blades therein, a lining in said cylinder at the receiving end only of material having an affinity for mercury, the balance of the cylinder and the retarding-blades being of material not having affinity for mercury, whereby the amalgam formed at the receiving-end of the cylinder will be rolled into balls and agitated as it passes through the cylinder with the gangue, collecting the precious metals therefrom, and finally passing out of the cylinder with the gangue, substantially as set forth.

2. The combination of a mercury-well for separating mercury and amalgamated particles of metal from gangue, with an amalgamating-cylinder, mechanism for rotating the same, spiral retarding-blades therein, and a cylinder-lining of material having an affinity for mercury, said amalgamating-lining being restricted to a limited portion of the cylinder at and near the receiving end, whereby the remaining portion of the cylinder is non-amalgamating and provides an extended surface on which the mercury and amalgam coated particles from the receiving end of the cylinder are agitated and rolled into balls with the particles collected from the gangue in its passage through this non-amalgamating portion of the cylinder and before being discharged with the gangue from the cylinder and into the mercury-well, substantially as specified.

3. The combination of an amalgamating-table, inclined amalgamating-plates $m$ $m'$ at the end thereof, and a well below said plates to receive the amalgam, said plate $m$ being removable for examination and to expose the plate $m'$ behind it, substantially as specified.

In testimony whereof I have signed my name to this specification in the presence of two subscribing witnesses.

HENRY COOK.

Witnesses:
HENRY HOWSON,
HARRY SMITH.